US011153302B2

(12) United States Patent
Bolignano

(10) Patent No.: US 11,153,302 B2
(45) Date of Patent: Oct. 19, 2021

(54) PEERING METHOD

(71) Applicant: Dominique Bolignano, Paris (FR)

(72) Inventor: Dominique Bolignano, Paris (FR)

(*) Notice: Subject to any disclaimer, the term of this patent is extended or adjusted under 35 U.S.C. 154(b) by 135 days.

(21) Appl. No.: 15/512,767

(22) PCT Filed: Sep. 18, 2015

(86) PCT No.: PCT/EP2015/071480
§ 371 (c)(1),
(2) Date: Mar. 20, 2017

(87) PCT Pub. No.: WO2016/042145
PCT Pub. Date: Mar. 24, 2016

(65) Prior Publication Data
US 2017/0295171 A1    Oct. 12, 2017

(30) Foreign Application Priority Data

Sep. 19, 2014  (FR) ........................................ 1458866

(51) Int. Cl.
*H04L 29/06* (2006.01)
*H04W 12/50* (2021.01)
(Continued)

(52) U.S. Cl.
CPC ......... *H04L 63/0853* (2013.01); *H04W 12/04* (2013.01); *H04W 12/08* (2013.01);
(Continued)

(58) Field of Classification Search
CPC .................................. G06F 9/00; H04L 29/00
See application file for complete search history.

(56) References Cited

U.S. PATENT DOCUMENTS 6,980,660 B1 * 12/2005 Hind .................... H04W 12/069
380/282
7,486,273 B1 * 2/2009 Aviles .................... G06F 3/016
345/156

(Continued)

FOREIGN PATENT DOCUMENTS

WO      2013061296 A2    5/2013

OTHER PUBLICATIONS

International Search Report issued in PCT/EP2015/071480 dated Dec. 15, 2015 (with English translation).
Written Opinion issued in PCT/EP2015/071480 dated Dec. 15, 2015.

*Primary Examiner* — Joseph P Hirl
*Assistant Examiner* — Leynna Truvan
(74) *Attorney, Agent, or Firm* — Kenealy Vaidya LLP

(57) ABSTRACT

Some embodiments are directed to a method for peering between first and second modules each installed in a different device, the device of the first module includes a human-machine interface, and the two devices can be linked by an unsecure communication channel. The method can include: receiving via the human-machine interface a command setting the device of the first module in operating mode so the first module takes control of a part of the communication means of the first device in order to set them in a secure operating mode and takes control of the human-machine interface; establishing a temporarily secure communication between first and second modules; displaying on the human-machine interface a status signaling the set-up of the secure communication; receiving via the human-machine interface a peering acceptance command; and exchanging of keys/secrets between the modules through the temporarily secure communication channel to perform the peering.

12 Claims, 2 Drawing Sheets

(51) Int. Cl.
*H04W 12/086* (2021.01)
*H04W 12/04* (2021.01)
*H04W 12/08* (2021.01)
*G06F 21/57* (2013.01)
*H04W 12/06* (2021.01)

(52) U.S. Cl.
CPC ......... *H04W 12/086* (2021.01); *H04W 12/50* (2021.01); *G06F 21/575* (2013.01); *H04W 12/06* (2013.01)

(56) References Cited

U.S. PATENT DOCUMENTS

| | | | |
|---|---|---|---|
| 2004/0068648 A1* | 4/2004 | Lewis | H04L 51/36 713/153 |
| 2009/0307660 A1* | 12/2009 | Srinivasan | G06F 8/314 717/114 |
| 2010/0115279 A1 | 5/2010 | Frikart et al. | |
| 2010/0127824 A1* | 5/2010 | Moschl | G05B 19/4184 340/5.65 |
| 2010/0218012 A1* | 8/2010 | Joseph | H04W 12/0808 713/310 |
| 2013/0145140 A1* | 6/2013 | Hsien | G06F 21/575 713/2 |
| 2014/0258724 A1 | 9/2014 | Lambert et al. | |

* cited by examiner

PEERING METHOD

CROSS REFERENCE TO RELATED APPLICATION

This application is a National Phase filing under 35 C.F.R. § 371 of and claims priority to PCT Patent Application No.: PCT/EP2015/071480, filed on Sep. 18, 2015, which claims the priority benefit under 35 U.S.C. § 119 of French Application No.: 1458866, filed on Sep. 19, 2014, the contents of which are hereby incorporated in their entireties by reference

BACKGROUND

Some embodiments relate to the security of computer systems and more particularly to the peering of keys at the initialization of a cryptographic protocol.

RELATED ART

In the field of computer security, we distinguish codes called trusted codes from those which are not trustworthy.

A code is called trusted when the user/the developer is confident that the code installed on a hardware will comply with a security policy or with a specification which generally constrains/limits the authorized behaviors. For example, this code would have been checked by formal methods guaranteeing that its operation is in compliance with the specifications.

In contrast, a code is not trustworthy in the other cases. The code has a behavior considered as potentially non-compliant with what it is supposed to do. Or what it is supposed to do is not compliant with what it is expected. This may occur either because it is written wrongly or written by actors who cannot be trusted, or because it has been attacked, or even configured wrongly. But this may also be the case if it lacks information on the code itself, or on the manner by which it has been developed. In the presence of a code which is not trustworthy in a security context, a pessimistic attitude is generally assumed by supposing that the considered code can use all means at its disposal to do the worst.

In the same manner, a communication channel is called secure if it is physically secure, or if it is secured virtually.

The communication channel is physically secure if it is secured by a physical control which prevents, generally by its construction, any functionality (for example, information leak) other than that(those) desired for this communication means. It is a concept similar to that of a trusted code when considering the channel as being a computer function.

And a communication channel is secured virtually if it uses a cryptographic protocol which brings certain security elements. For example, a VPN (<<Virtual Private Network>>) is a virtually secured channel.

In order to initiate a cryptographic protocol between two actors so as to ensure certain security properties therebetween (in general, integrity, and/or authentication, and/or confidentiality, . . . ), the first step should be to pass by a configuration, herein called a peering of the actors, in which each has certain keys or specific secrets which allow establishing a certain correspondence. For example, a first actor will have to have a public key, and the other actor the corresponding private key, or two actors will share a certain symmetric key. In order to enable certain cryptographic protocols, a distribution of keys between the actors should therefore be performed beforehand, that is to say the proper peering. This peering may be the result of a cryptographic protocol of distribution of keys and secrets. But this last protocol should have, in turn, leaned on a prior distribution of the keys that it needs in order to operate. Thus, at the beginning, we should lean on a distribution of keys which does not lean on cryptographic means and therefore on secure or secured by control communication channels. This peering, which is called herein physical peering, is generally done in a secure location or in factory, which is called <<pre-issuance>> by those skilled in the art. It allows installing one or several root key(s) which will serve as a core to install other keys. This is for example the case of the TSM (<<Trusted Secure Manager>>) based architectures, in which a root key will be placed in each device using at one step a physical protection of the distribution (for example, by means of a HSM (<<Hardware Security Module>>)).

Nonetheless, this physical peering performed in a secure location implies a considerable hardware and/or logistical constraint in the distribution to the different users.

Therefore, there is a real need to be able to perform peerings overcoming these defects, drawbacks and obstacles of the prior art, in particular a method allowing peering without passing through a prior physical peering in a secure location in order to reduce the costs and improve the user experience.

Description

In order to solve one or more of the aforementioned drawbacks, a peering method between a first and a second trusted modules, each being installed in a different device, the device on which the first module is installed comprising a human-machine interface to communicate with a user, and the two devices having communication means allowing linking them together by an unsecure communication channel, comprises:

reception via the human-machine interface of a command setting the device of the first trusted module in an operating mode such that the first trusted module takes control of at least one part of the communication means of the first device in order to set them in a secure operating mode and takes control of the human-machine interface;

establishment of a temporarily secure communication between the first and the second trusted modules;

display on the human-machine interface of a status signaling the set-up of the secure communication;

reception via the human-machine interface of a peering acceptance command;

exchanges of keys or of secrets between the two modules through the temporarily secure communication channel in order to perform the peering.

Particular features or embodiments, which may be used alone or in combination, are:

the peering acceptance command comprises a datum enabling the authentication of the user by one of the trusted modules;

the datum is transmitted to the second trusted module by the first trusted module;

one of the two trusted areas contains beforehand one or several key(s) used to perform the peering; and/or a third trusted module being installed on a third device comprising no human-machine interface, the peering method having been performed between the first and the second trusted modules, the method is repeated between the first and the third trusted modules by using keys associated to the first peering so that a peering between the second and the third trusted modules is performed by transitivity.

Another aspect of the invention relates to a computer program to be installed in a computer, comprising instructions for implementing the steps of the peering method as defined hereinabove during an execution of the program by a calculation unit of said apparatus.

BRIEF DESCRIPTION OF THE FIGURES

The invention will be better understood upon reading the following description, given only as example, and with reference to the appended figures wherein.

DETAILED DESCRIPTION OF ONE FORM OF EMBODIMENT

Figure 1:
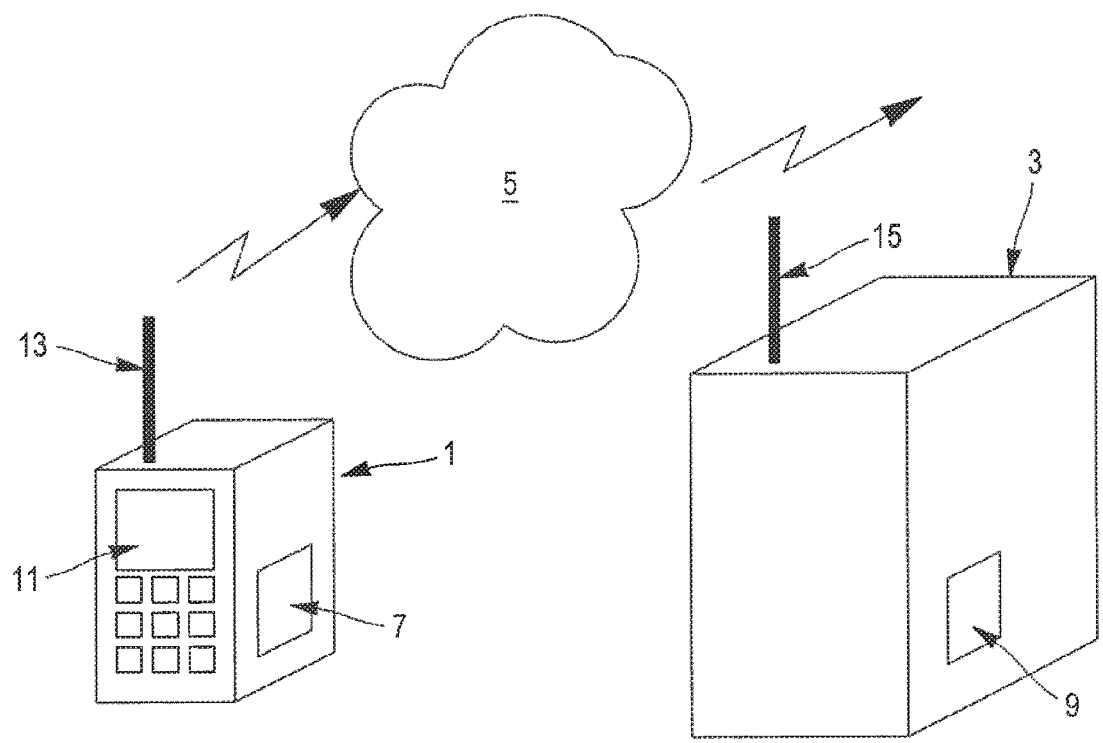
FIG. 1 represents a system capable of implementing a method according to an embodiment of the invention.

With reference to FIG. 1, two devices 1, 3 are linked by a communication channel 5. For example, the two devices are two computers and/or mobile phones connected by an Internet-type data connection.

Each device 1, 3 includes a trusted module 7, 9 respectively. For example, this trusted module may be a specific electronic circuit, a combination of a dedicated calculator and its control software or a specific software intended to be executed on the general calculator of the device 1, 3. The software(s) will be preferably stored in read-only memories so that a third-party could not modify them. These trusted modules have been particularly tested and validated in order to guarantee an operation in compliance with the specifications.

Moreover, at least one of the devices, for example the device 1, comprises a human-machine interface 11 enabling a communication with a user of this device.

The devices 1, 3 also comprise communication means 13, 15 allowing establishing a communication through the communication channel 5.

The trusted module 7 of the device 1 is adapted to punctually take the (exclusive) control of the human-machine interface 11 (or of a part of this interface which may be sufficient for a certain interaction with the user, for example a security window) as well as of at least one part of the communication means 13. For example, the communication means conventionally comprise a hardware part (modem, antenna, etc.) and a software part for signal processing and management of the protocols. The trusted module can use the hardware part while replacing the software part with a software part of its own and which it trusts, or by using the problematic software or hardware part in a particular context which will enable trust. Thus, for example, the stack modem for a link between the trusted module called TEE (<<Trusted Execution Environment>>) in the mobile phones world and the SIM card will be used in fail soft that the trusted area can control sufficiently to perform the exchange of keys with the desired security level (for example by not launching the communication function of the modem, and by making the stack modem restart at the end of the peering phase in order to force it to forget the secrets that have been entrusted thereto without trust).

In the same manner, it may take control of the hardware composing the human-machine interface 11 in order to pilot it with its own software modules.

Figure 2:
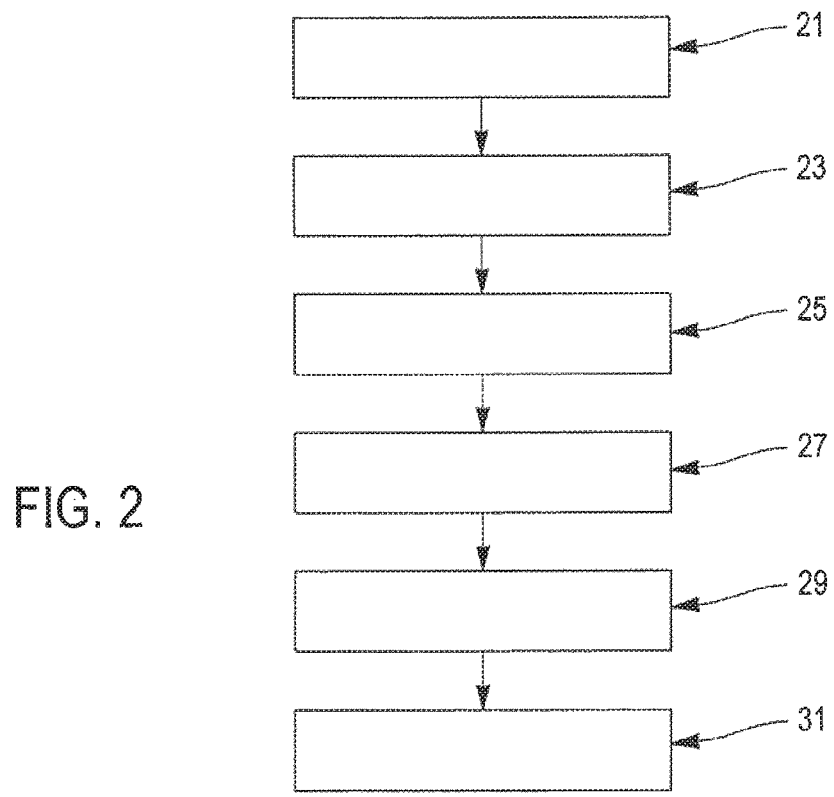
FIG. 2 represents a flowchart of a peering method according to one embodiment.

The two devices 1, 3 then perform a peering in the following manner, FIG. 2.

The launching of the peering procedure is performed by the user who sends, via the human-machine interface, at step 21a command setting the device 1 in an operating mode such that its trusted module 7 takes control of at least one part of its communication means 13 in order to set them in a secure operating mode and also takes control of the human-machine interface 11. It should be noted that this operating mode will temporarily limit the functionalities of the device 1 accessible to the user. Indeed, in order to limit the risks of security bypass, the user will not have access to other applications on his human-machine interface 11.

In particular, this peering is performed during a particular and fail soft operating phase of the device 1, which phase is generally placed in the boot phase, and which the user can recognize. Thus, for example, the user can cause this particular operation by a sequence of particular keys or responses during the boot phase.

The trusted module 7 having taken control of at least one part of the communication means 13 will establish, at step 23, a secure communication with the device 3 and more particularly its trusted module 9. This secure communication is temporary because it will cease as soon as the trusted module will return the control of the communication means 13 back to the device 1, in its usual operating mode.

Once the trusted module 7 has established the secure communication with the trusted module 9, it informs the user via a message, at step 25.

The user validates, at step 27, the set-up of this secure communication by sending a peering acceptance command. For example, the screen displays a message <<A secured communication is set up with the device 3. Do you accept peering your device with this device 3?>> and two buttons <<OK>> and <<Cancel>> allow accepting, respectively refusing, the peering.

Upon validation by the user, the two modules 7, 9 therefore exchange, at step 29, the keys and/or secrets via the secure communication in order to perform the peering of the two apparatuses.

Then, at step 31, the secure communication is closed and the trusted module 7 withdraws the control of the human-machine interface 11 and of the communication means 13.

In a first variant, the acceptance of peering, at step 27, by the user is not accepted unless the user authenticates to one of the trusted modules 7, 9. For example, the user must enter a secret code which is checked by one of the trusted modules 7, 9. This may be the first trusted module 7 but, preferably, this check is performed by the trusted module 9 of the second device 3.

The peering keys may be stored in any secure location accessible via a secure communication link by at least one of the trusted modules. For example, the second device may be a bank server whose trusted module has access to a HSM. However, in a second variant, at least one part of these keys and secrets may be stored directly in one of the two trusted modules 7, 9.

In a third variant, the peering method may be used between two devices without any human-machine interface. For this purpose, a device with a human-machine interface is used as an intermediate.

Figure 3:
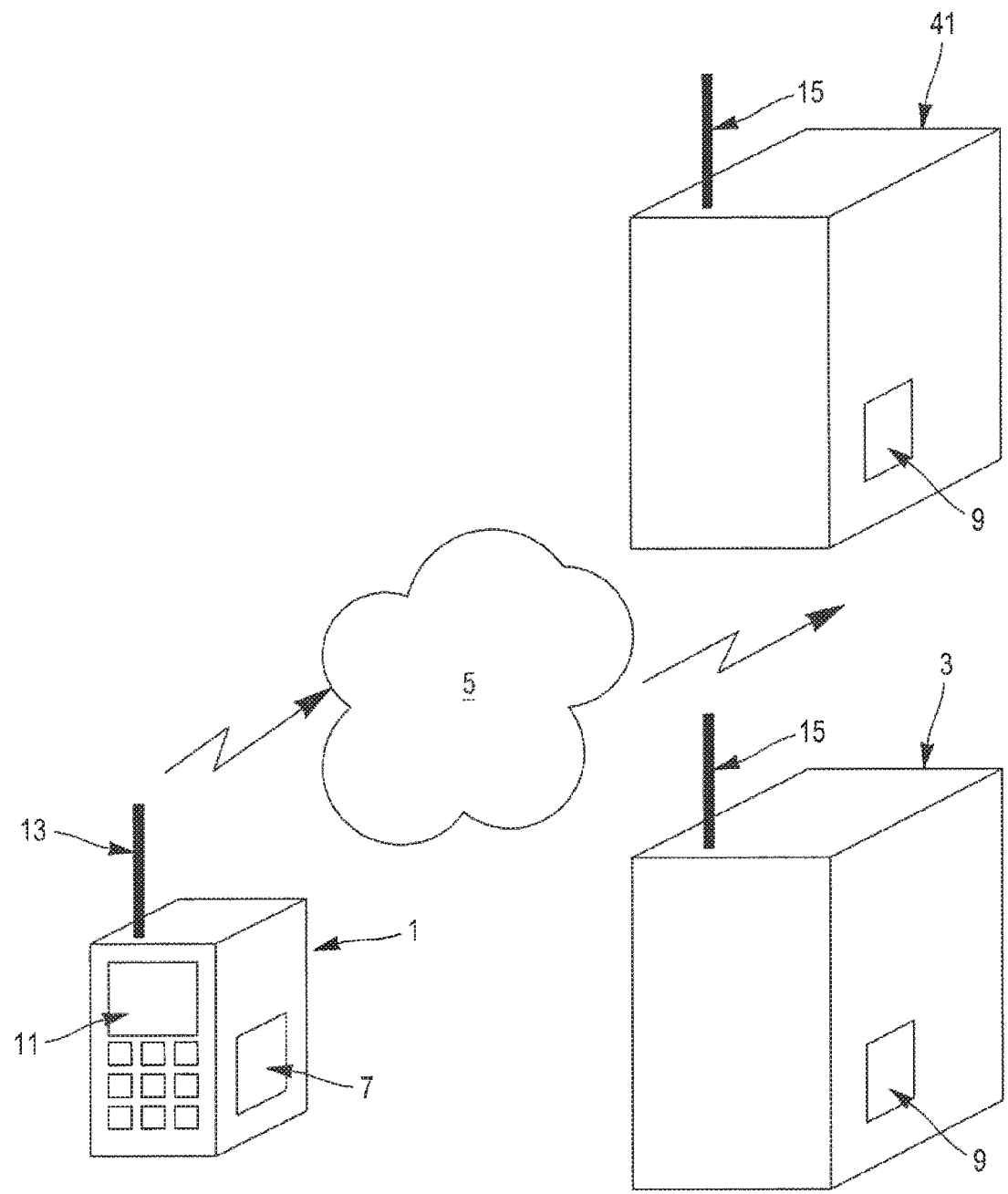
FIG. 3 represents a system implementing a variant of the method of FIG. 2.

Thus, FIG. 3 represents the previously described two devices 1, 3 and a third device 41 similar to the device 3 in that it has no human-machine interface but rather a communication channel with the device 1. The peering method having been performed between the trusted modules 7, 9, the method is repeated between the trusted module 7 and the trusted module of the device 41 by using keys associated to the first peering so that a peering between the second and the third trusted modules is performed by transitivity.

An example of use of the described method is when the device 1 is a mobile, the first trusted area is the TEE of the mobile or one of its domains/containers. The screen is that of the telephony user interface (TUI). For example, the second trusted area is a secure element (SE) or one of its security domains and this second trusted area is already personalized (for example, peered with a server). The peering will allow peering the two trusted areas, or the first one and the server (by transitivity). Thus, we will have realized a function which is generally realized by a TSM for mobiles without the need for pre-loading any key in the mobile.

The invention has been illustrated and described in detail in the drawings and in the preceding description. This should be considered as illustrative and given as example and not as limiting the invention to this sole description. Numerous variants are possible.

Thus, the example hereinabove shows that the two devices may be physically confounded within the same phone casing. Thus, the first and second devices may be confounded in one unique apparatus including two distinct trusted modules communicating together, in a conventional operating mode, only via an unsecure communication link. Thus, this concept of two devices is used in this document only for clarity purpose.

In the claims, the word <<comprising>> does not exclude the presence of other elements and the indefinite article <<a/an>> does not exclude a plurality.

The invention claimed is:

1. A method for peering between a first trusted module and a second trusted module by transmission of at least one root key, the first and second trusted modules being installed in a first device and a second device, respectively, and the first device on which the first trusted module is installed including a human-machine interface to communicate with a user, and the first and second devices having respective communication means allowing linking the first and second devices together by an unsecure communication channel, the method comprising:
   linking, by the first device, to the second device so as to establish the unsecure communication channel;
   receiving, by the first device, via the human-machine interface and during a boot phase, a command;
   setting, in response to receiving the command, the first device in a secure operating mode, wherein setting the first device in the secure operating mode includes:
      (a) the first trusted module taking control of at least part of the communication means of the first device; and
      (b) the first trusted module taking control of the human-machine interface; and while the first device is in the secure operating mode and during the boot phase:
   establishing, by the first device, a temporary secure communication channel between the first and the second trusted modules;
   displaying, by the first device, on the human-machine interface a status signaling the set-up of the temporary secure communication channel;
   receiving, by the first device, via the human-machine interface a peering acceptance command;
   performing the peering between the first and second devices by exchanging the at least one root key between the first and second trusted modules through the temporary secure communication channel;
   once the peering is performed, the first trusted module ceasing the temporary secure communication; and
   withdrawing control of the communication means and the human-machine interface.

2. The method according to claim 1, wherein the peering acceptance command includes a datum enabling authentication of the user by one of the first and second trusted modules.

3. The method according to claim 2, wherein the datum is transmitted to the second trusted module by the first trusted module.

4. The method according to claim 1, wherein one of the first and second trusted modules contain beforehand one key or several keys used to perform the peering.

5. The method according to claim 1, wherein a third trusted module being installed on a third device includes no human-machine interface, the method having been performed between the first and the second trusted modules and resulting in a first peering between the first and the second trusted modules,
   the method is repeated between the first and the third trusted modules by using the at least one root key associated to the first peering so that a second peering between the second and the third trusted modules is performed by transitivity.

6. A non-transitory computer readable medium comprising program code instructions for the implementation of the peering method according to claim 1.

7. A method for peering between a first trusted module and a second trusted module by transmission of at least one root key, the first and second trusted modules being installed in a first device and a second device, respectively, and the first device on which the first trusted module is installed including a human-machine interface to communicate with a user, and the first and second devices having respective communication means allowing linking the first and second devices together by an unsecure communication channel, the method comprising:
   linking, by the first device, to the second device so as to establish the unsecure communication channel;
   receiving, by the first device, via the human-machine interface and during a boot phase, a command;
   setting, in response to receiving the command, the first device in a secure operating mode, wherein setting the first device in the secure operating mode includes:
      (a) the first trusted module taking control of at least part of the communication means of the first device; and
      (b) the first trusted module taking control of the human-machine interface; and while the first device is in the secure operating mode and during the boot phase:
   establishing, by the first device, a temporary secure communication channel between the first and the second trusted modules;
   displaying, by the first device, on the human-machine interface a status signaling the set-up of the temporary secure communication channel;
   receiving, by the first device, via the human-machine interface a peering acceptance command;
   performing the peering between the first and second devices by exchanging the at least one root key between the first and second trusted modules through the temporary secure communication channel and achieving a first peering state between the first and the second trusted modules as the result the exchanging the at least one root key between the first and second trusted modules;
   once the peering is performed, the first trusted module ceasing the temporary secure communication; and withdrawing control of the communication means and the human-machine interface.

8. The method according to claim 7, wherein the peering acceptance command includes a datum enabling authentication of the user by one of the first and second trusted modules.

9. The method according to claim 8, wherein the datum is transmitted to the second trusted module by the first trusted module.

10. The method according to claim 7, wherein one of the first and second trusted modules contain beforehand one key or several keys used to perform the peering.

11. The method according to claim 7, wherein a third trusted module being installed on a third device includes no human-machine interface, the method having been performed between the first and the second trusted modules and resulting in the first peering state between the first and the second trusted modules, the method is repeated between the first and the third trusted modules by using the at least one root key associated to the first peering so that a second peering state between the second and the third trusted modules is achieved by transitivity.

12. A non-transitory computer readable medium comprising program code instructions for the implementation of the peering method according to claim 7.

* * * * *